United States Patent [19]

Dewey

[11] 4,380,413
[45] Apr. 19, 1983

[54] LOAD-DISTRIBUTIVE WASHER FOR USE WITH COMPRESSIBLE MATERIAL

[75] Inventor: George G. Dewey, Prospect Heights, Ill.

[73] Assignee: Illinois Tool Works Inc., Chicago, Ill.

[21] Appl. No.: 202,960

[22] Filed: Nov. 3, 1980

[51] Int. Cl.³ .............................................. F16B 21/07
[52] U.S. Cl. .................................... 411/161; 411/531
[58] Field of Search .................. 52/410; 411/531, 533, 411/542, 371, 160, 161, 162

[56] References Cited

U.S. PATENT DOCUMENTS

| | | | |
|---|---|---|---|
| 212,549 | 2/1879 | Gear | 411/533 |
| 1,286,862 | 12/1918 | Williams | 411/371 |
| 3,088,361 | 5/1963 | Hallock | 411/371 |
| 3,090,203 | 5/1963 | Durget | 61/45 |
| 4,030,261 | 6/1977 | Coleman | 52/410 |
| 4,074,501 | 2/1978 | Sandquist | 52/410 |

FOREIGN PATENT DOCUMENTS 2711335  9/1978  Fed. Rep. of Germany ........ 52/410

Primary Examiner—Wayne L. Shedd
Attorney, Agent, or Firm—Thomas W. Buckman; David I. Roche

[57] ABSTRACT

A plastic load-distributive washer for use with compressible materials. An axial projection has a laterally extending external flange and an internal throughbore. A portion of the throughbore has a lateral dimension exceeding the maximum lateral dimension of a fastener head with which it is used and an axial length which is at least several times the height of the fastener head. The washer is free to float with the compressible material subject to loading while the fastener remains unmoved. The washer may also be provided with a flexible snap ring to limit the amount of relative movement and a plurality of one-way fingers which cooperate with projections on the head to restrict relative rotational movement between the washer and fastener in the removal direction.

7 Claims, 6 Drawing Figures

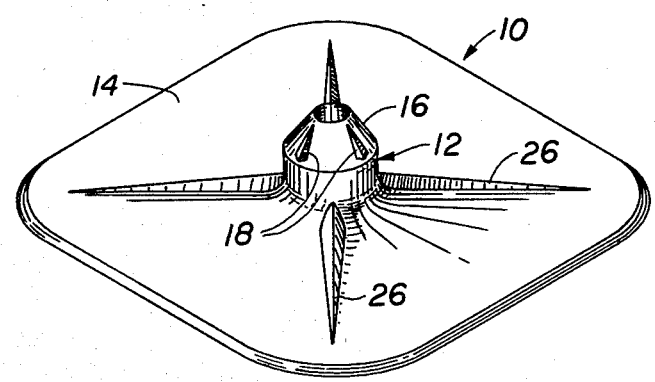
FIG. 1
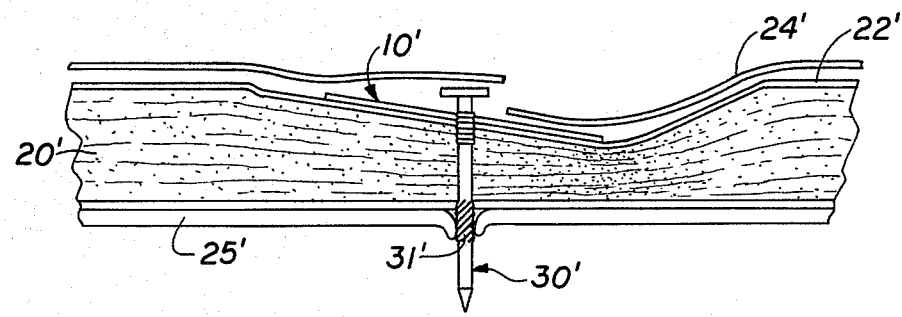
FIG. 2
PRIOR ART
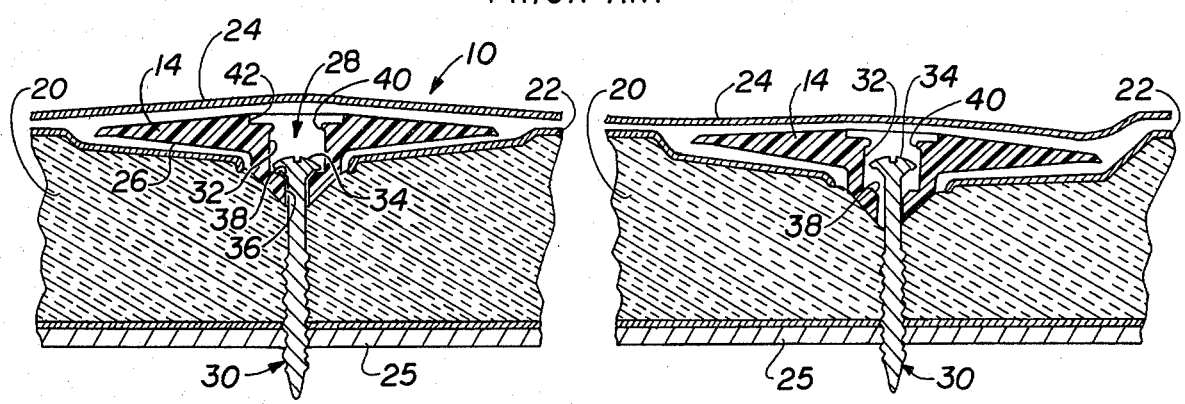
FIG. 3A                    FIG. 3B

LOAD-DISTRIBUTIVE WASHER FOR USE WITH COMPRESSIBLE MATERIAL

BACKGROUND AND SUMMARY OF THE INVENTION

The present invention is directed to a load-distributive washer for use in attaching compressible material to a base member. One example of such usage is in affixing compressible insulations to roof decks or the like on what is known as a builtup roof.

In formulating the builtup roof, a compressible insulating material is secured to the metallic, wooden or concrete roof deck. This insulation generally has either a paper or foil backing layer secured to one surface. Fasteners such as nails with large washers are used to secure the insulation to the deck followed by applications of asphalt and paper or cloth membranes to form a water tight seal.

As materials are moved about on the roof, a workman may step on or near a washer or cause a wheelbarrow or other equipment to roll over or near a washer. Such localized applications of force can cause the fastener head to pop through the upper membrane or the edge of the washer to pierce the backing layer. Such discontinuities in either the membrane or the backing layer can permit the influx of the asphalt or moisture into the insulation. Such occupation of the interstices of the insulating material reduces the effectiveness of the insulation and can result ultimately in a leaky roof.

Various attempts have been made to correct this problem. One such solution employs a fastener and washer which as a unit can provide some limited movement relative to the insulation and to the metal deck. A principal drawback of such a system is that as the fastener moves relative to the deck, it tends to ream the hole which can result in failure of the fastener. Further, this system is restricted to use with a nail and cannot employ a screw which can provide superior pullout characteristics.

The present invention is directed to a washer which can float relative to the fastener in response to a force directed against or near the load-distributing flange of the washer. An axially extending projection has an internal diameter which exceeds that of the fastener head and a length which is several times the height of the head. The fastener, then, remains securely and immovably fixed to the roof deck while the washer is free to fall and rise responsive to the contraction and expansion of the insulation during and following the application of a compressive force. Such a washer can readily be used with either a nail or screw type mechanical fastener.

For some applications, the washer is preferably made of a resilient plastic material. A plastic washer of this type can further deflect under the application of localized forces preventing the edge of the washer from digging into the backing layer.

An additional feature which this washer can have is a flexible snap ring positioned within the throughbore in the washer. When the fastener is inserted through the washer, the flexible ring will deflect to permit passage of the fastener head and provide a snap fit between the washer and fastener. This will provide an upper limit to the maximum amount of relative movement between the fastener and the washer which is possible. Ordinarily, this upper limit will not be reached since the length of the washer projection will be selected such that under normal load conditions, the compressibility of the insulation will limit further downward movement before the head engages the resilient ring. If the maximum washer deflection is reached, however, the resilient ring will substantially increase the resistance to movement and prevent the fastener head from puncturing the membrane. The resilient ring secondarily reduces the size of the aperture above the fastener head and decreases the likelihood that adhesive or asphalt will fill up the throughbore and reduce the floating capability of the washer.

Other features, characteristics, and advantages of the present invention will become apparent after a reading of the following specification when taken in conjunction with the accompanying drawings.

BRIEF DESCRIPTION OF THE DRAWINGS

FIG. 1 is a perspective view of the washer turned upside down;

FIG. 2 is a schematic side view of a prior art clamping member;

FIG. 3A is a cross-sectional side view of the washer of the present invention shown in clamping position;

FIG. 3B is a cross-sectional side view similar to FIG. 3B showing the washer deflecting under load;

DETAILED DESCRIPTION OF THE PREFERRED EMBODIMENTS

Figure 4:
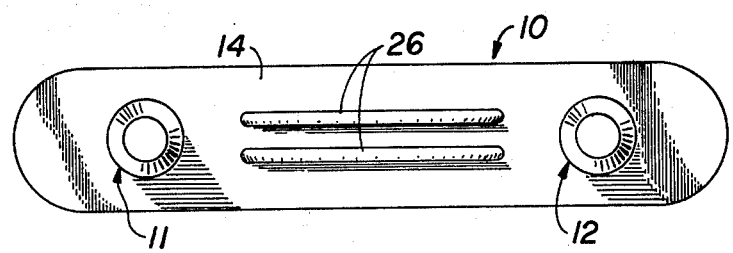
FIG. 4 is a top view of a second embodiment of the washer of the present invention.

One embodiment of the load-distributive washer of the present invention is depicted in FIG. 1 generally as 10. An axial projection 12 has flange 14 extending laterally outwardly from one end thereof. The opposite free end 16 of the projection is preferably tapered and has four equally spaced cutting ribs 18 thereon (two of which are shown) to facilitate penetration of the projection into the compressible material 20 (FIG. 3A) through backing layer 22.

While the washer of the present invention may be of any material, a plastic material is preferred. The flexibility of the plastic washer will further reduce the possibility that the edge of the washer will damage the backing layer 22 or covering membrane 24. The plastic washer may have reinforcing ribs 26 tapering outwardly from projection 12. These ribs 26 make it possible to reduce the thickness of flange 14 and, hence, the overall material usage.

As best seen in FIGS. 3A and 3B, washer 10 has a throughbore 28 to receive fastener 30. A portion 32 of throughbore 28 has a lateral dimension exceeding the lateral dimension of fastener head 34 and a length which is at least several times the height of the head 34. A portion 36 of throughbore 28 has a reduced lateral dimension and a shoulder or bearing surface 38 is formed between portions 32 and 36. Flexible ring 40 is positioned above bore portion 32 and provides means for creating a snap fit between the washer and the fastener. A recess 42 is formed in the outer or upper surface (as shown in FIGS. 3A and 3B) coaxial with the remaining portion of throughbore 28. This recess 42 is of a size and shape to receive the nosepiece of a drive tool (not shown) which may, for example, be of the type shown in U.S. Patent Application Ser. No. 59,867, now U.S. Pat. No. 4,236,555.

FIG. 2 depicts a prior art clamping member. A flat metallic washer 10' used in conjunction with nail 30' clamps compressible insulation 20' to metal deck 25'. Subsequently, the fastened insulation is overlaid with layers of asphalt and paper membranes 24'. As work continues on the buildup roof, application of a compressive force at or near the edge of washer 10' can cause the nail head to pop through the membrane 24' as seen in FIG. 2. The edge of the rigid washer can also pierce the backing layer 22' providing a path for influx of the asphalt or moisture into the insulation. Occupation of the interstices of the insulation by a foreign substance reduces the effectiveness of the insulation. Further, such holes in the upper layers produce access to the elements resulting in a leaky roof.

One attempt to solve this problem has been to reposition the knurled holding section 31' on the nail so that it engages below the desk 25'. It is hoped that the opening in the deck will be closed slightly after section 31' passes through. Then, the washer 10' and fastener 30' can move together responsive to the compressive force. However, to insure that the nail will move responsive to a force applied at the washer's outer edge, the washer must be more closely fit to the shank of the nail. These tighter tolerances reduce the amount of tilting the washer can do with respect to the fastener. More importantly, movement of the nail with respect to the deck tends to enlarge the hole to a point the nail can be pried up to the position shown in FIG. 2 and, possibly, completely out of engagement with the deck. Not only is the covering membrane damaged but the fastener is, then, no longer securing the insulation to the deck.

In distinction to that, as shown in FIG. 3B by virtue of enlarged portion 32, applicant's washer can float relative to the fastener, as well as tilt. Additionally, the flexibility of the plastic washer's edges further eliminates the possibility of puncturing the membrane 24 or backing layer 22. Should the load be excessive, the flexible ring 40 will increase the resistance to further downward movement of the washer eliminating the possibility that the fastener head will pierce membrane 24. Ring 40 secondarily serves to reduce the size of opening 32 and, hence, the likelihood of material influx. The washer of the present design can be used with either nails or screws. However, screws are preferred since they offer from two to five times the pullout values available from a nail.

Figure 5:
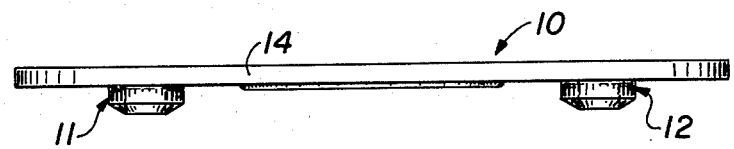
FIG. 5 is a side view of the FIG. 4 embodiment.

A second embodiment of the present invention is depicted in FIGS. 4 and 5. In this embodiment, first and second axial projections 11 and 12 are connected to a common flange 14. A pair of reinforcing ribs 26 extend along the flange 14 between the two projections. Such a configuration may be desirable for some applications such as bridging a seam in the compressible layer 20.

Figure 6:
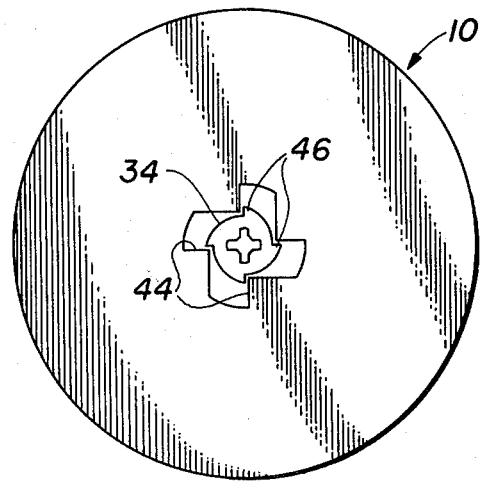
FIG. 6 is a top view of yet a third embodiment of the washer of the present invention.

Still another feature is depicted in FIG. 6. Under some conditions, such as where the roof deck is subject to a large amount of vibration, some screws may tend to back out. This tendency can be counteracted by forming the interior of hole portion 32 with one-way fingers 44 and the head 34 of the fastener with projections 46. The fingers 44 will deflect to permit fastener insertion but engage projections 46 eliminating counter rotation. In order for a fastener to be backed out, a removal force will have to overcome not only the thread engagement between the threads of fastener 30 and the deck 25, but also the frictional resistance between the undersurface of the washer 10 and backing layer 22, as well as that between the projection 12 and the compressible insulation 20. The reinforcing ribs 26 also tend to dig into the backing layer and further increase resistance to turning.

While the present invention has been described in conjunction with specific embodiments, certain changes, modifications and alternatives will become apparent to a person of ordinary skill in the art following a reading of the foregoing specification. For example, although the washer has been depicted as square, round and elliptical in these embodiments, it will be appreciated that other shapes are also possible. Further, the flexible snap ring need not be a complete annulus but may be interrupted which will increase flexibility. If increased flexibility is not desired for a particular washer material, the inner diameter of the ring can be decreased further closing off the opening. If the adhesive or asphalt tends to fill up hole portion 32, in spite of the decreased dimensions, then recess 42 can be configured to receive a snap-in cover slug. Accordingly, it is intended that all such changes, modifications and alternatives as come within the scope of the appended claims be considered as part of the present invention.

I claim:

1. A resilient load-distributive washer useful in conjunction with a headed mechanical fastener to secure a first compressible material to a second base member, said washer comprising an axially extending projection which has a length that extends into but is less than the thickness of the compressible material to be fastened; a load-distributing flange extending laterally outwardly from one end of the projection, the other end of the projection being free; a throughbore positioned along the central axis of the washer and extending through the projection and the flange, at least a portion of said throughbore having a first internal lateral dimension exceeding the maximum lateral dimension of the head and a length that is at least equal to the height of the fastener head; a portion of the throughbore nearest the free end of the projection having a second smaller internal lateral dimension forming a bearing surface for the fastener head; an integral flexible and resilient ring positioned above said portion of the throughbore said ring having an inner lateral dimension less than the maximum lateral dimension of said fastener head and sufficient flexibility and resilience to permit passage of the fastener head while delimiting the relative axial movement between the washer and the fastener.

2. The load-distributive washer of claim 1 wherein the washer further comprises means within said portion of the throughbore for cooperating with the fastener head to discourage relative rotation between the washer and the fastener.

3. The load-distributive washer of claim 1 wherein the washer further comprises a second axially extending projection spaced laterally from said first projection for receiving a second mechanical fastener.

4. The load-distributive washer of claim 1 wherein said ring is comprised of a plurality of segments extending inwardly to substantially close off said throughbore.

5. The load-distributive washer of claim 1 wherein the free end of the projection includes a tapered portion to facilitate insertion into the compressible material.

6. The load-distributive washer of claim 5 wherein the tapered portion includes a plurality of sharp-edged projections which further facilitate washer insertion into the compressible material.

7. The load-distributive washer in claim 1 wherein the outer surface of the load-distributing flange has a recess coaxial with the throughbore which is adapted to receive and align a nosepiece of a drive tool.

* * * * *